United States Patent [19]
Heller

[11] Patent Number: 5,697,184
[45] Date of Patent: *Dec. 16, 1997

[54] FISHING ROD BUTT AND METHOD OF ASSEMBLING

[76] Inventor: Barry Heller, 399 Poinciana Island Dr., North Miami Beach, Fla. 33160

[*] Notice: The term of this patent shall not extend beyond the expiration date of Pat. No. 5,522,169.

[21] Appl. No.: 657,167

[22] Filed: Jun. 3, 1996

Related U.S. Application Data

[63] Continuation of Ser. No. 272,579, Jul. 11, 1994, Pat. No. 5,522,169.

[51] Int. Cl.⁶ .......................................... A01K 87/08
[52] U.S. Cl. .......................................... 43/23; 43/18.1
[58] Field of Search .......................................... 43/23, 22, 20, 43/25, 18.1, 18.5; 156/293, 294

[56] References Cited

U.S. PATENT DOCUMENTS

| | | | |
|---|---|---|---|
| 831,150 | 9/1906 | Fraser | 43/25 |
| 4,083,141 | 4/1978 | Shedd et al. | 43/22 |
| 4,398,369 | 8/1983 | Wiebe | 43/18.1 |
| 4,520,587 | 6/1985 | Wallace | 43/18.1 |
| 4,637,157 | 1/1987 | Collins | 43/22 |
| 4,747,227 | 5/1988 | Kress | 43/18.1 |
| 4,762,584 | 8/1988 | Andreasen et al. | 43/22 |
| 5,288,359 | 2/1994 | Stobbie, IV et al. | 43/23 |

*Primary Examiner*—Jeanne Elpel
*Attorney, Agent, or Firm*—Foley & Lardner

[57] ABSTRACT

A fishing rod butt is provided with a rod blank having upper and lower ends. A handle grip comprised of a dual layer is placed over a portion of the rod blank. A reel seat is also placed over at least a portion of the rod blank and is positioned adjacent the handle grip. A pair of wood arbors are positioned over the rod blank on each side of the hand grip. A gimbal is positioned on the rod blank on the lower end thereof and a cap is placed over the gimbal. The arbor at the upper end of the rod blank receives a reel seat thereover. A ferrule may be inserted and extend from the reel seat, the ferrule receiving a fishing rod therein. A method of assembling a fishing rod butt includes the steps of sliding a dual layer hand grip over a rod blank such that an upper portion and lower portion of the rod blank extend from the hand grip. An arbor is slid over each of the upper and lower portions of the rod blank and are glued thereto. A gimbal is also glued to one of the arbors, while a reel seat is glued to the other.

19 Claims, 3 Drawing Sheets

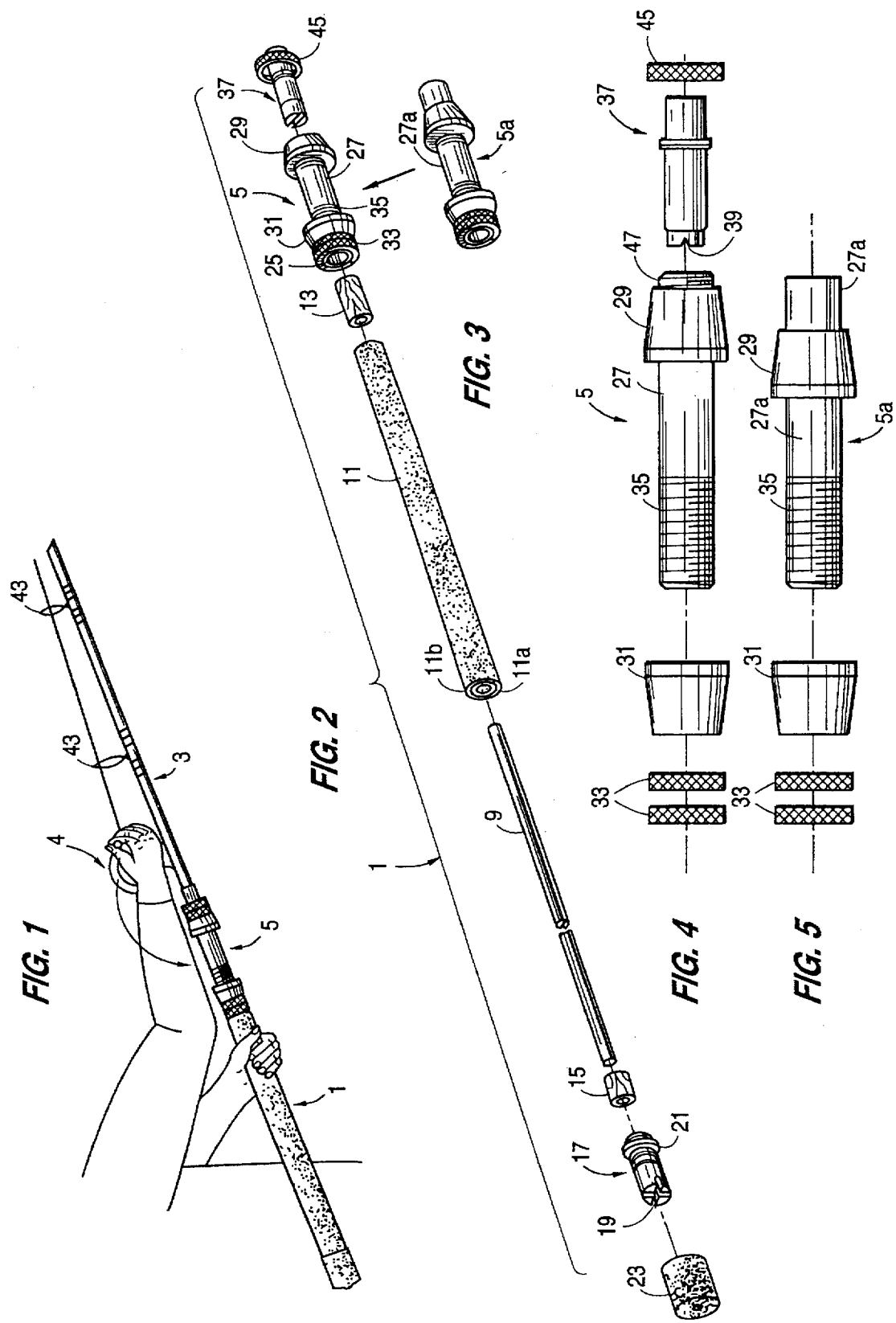

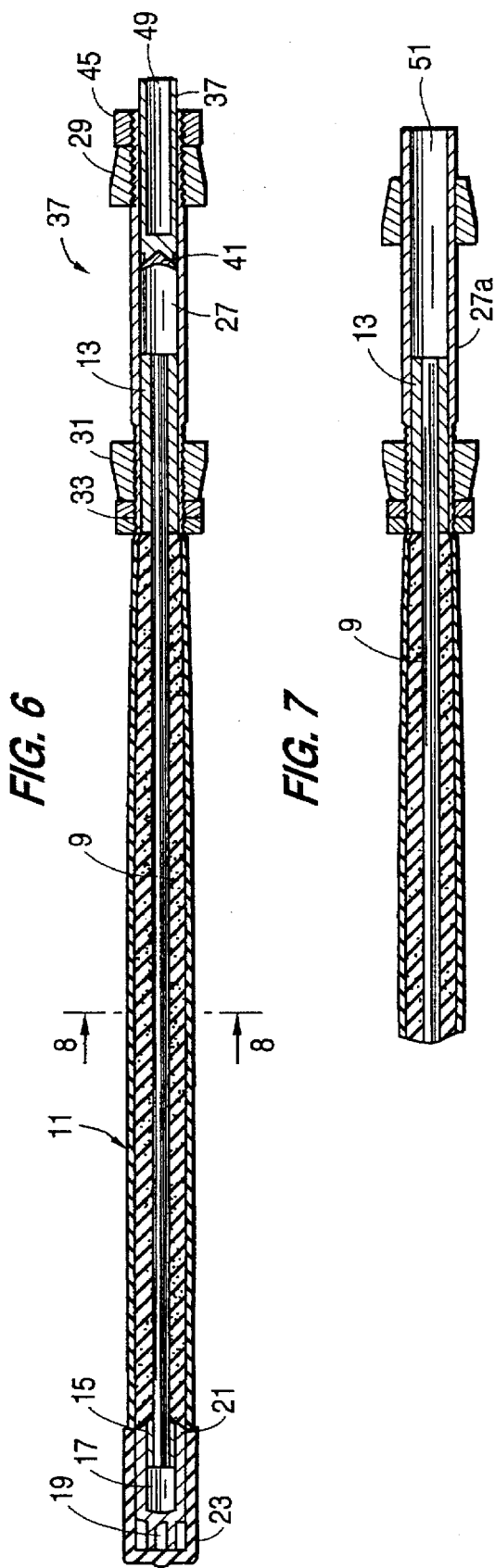

5,697,184

FISHING ROD BUTT AND METHOD OF ASSEMBLING

This application is a continuation of application Ser. No. 08/272,579, filed Jul. 11, 1994, now U.S. Pat. No. 5,522,169.

FIELD OF THE INVENTION

This invention relates in general to a fishing rod butt, and more particularly to an improved assembly and method thereof.

BACKGROUND OF THE INVENTION

DESCRIPTION OF RELATED ART

In the past, wood rod butts have been used, as well as stronger, but heavier, aluminum rod butts.

U.S. Pat. No. 4,083,141 illustrates a fishing rod butt and reel seat which is hollow and includes a receptacle for receiving the end of a boat rod.

U.S. Pat. No. 4,637,157 discloses a multi-part butt and reel seat in which a fishing rod blank extends through the interior of the butts.

U.S. Pat. No. 4,747,227 illustrates a fishing rod including a handle portion which has a piece of rod blank extending therethrough.

U.S. Pat. No. 4,520,587 discloses a fishing rod butt having a rod blank extending therethrough and projecting from its forward end and received within the end of a tubular fishing rod.

U.S. Pat. No. 4,398,369 illustrates a modular fishing rod having a handle which includes a centrally disposed piece of rod blank.

There has been prior use, but unknown patents with relation to the use of a dual layer hand grip for use on fishing rods designed to protect the rod from abrasions. This prior use included a foam inner portion and a more dense protective outer coating.

None of the prior art fishing rod butts provided the desired relatively light modular construction with strength and versatility which are objects of the instant invention.

SUMMARY OF THE INVENTION

A fishing rod butt is provided with a rod blank having upper and lower ends. A hand grip comprised of a dual layer is placed over a portion of the rod blank. A reel seat is also placed over at least a portion of the rod blank and is positioned adjacent the hand grip. A pair of wood arbors are positioned over the rod blank on each side of the hand grip. A gimbal is positioned on the rod blank on the lower end thereof and a cap is placed over the gimbal. The arbor at the upper end of the rod blank receives a reel seat thereover. A ferrule may be inserted and extend from the reel seat, the ferrule receiving a fishing rod therein.

A method of assembling a fishing rod butt includes the steps of sliding a dual layer hand grip over a rod blank such that an upper portion and lower portion of the rod blank extend from the hand grip. An arbor is slid over each of the upper and lower portions of the rod blank and are glued thereto. A gimbal is also glued to one of the arbors, while a reel seat is glued to the other.

BRIEF DESCRIPTION OF THE DRAWINGS

FIG. 1 is a side elevation view of a fishing rod incorporating the instant invention;

FIG. 2 is an exploded view of the fishing rod butt;

FIG. 3 is an alternate form of a reel seat illustrated in FIG. 2;

FIG. 4 is an exploded view of the reel seat illustrated in FIG. 2;

FIG. 5 is an exploded view of the reel seat illustrated in FIG. 3;

FIG. 6 is a cross sectional view of the invention illustrating the two piece embodiment of FIGS. 2 and 4;

FIG. 7 is a cross sectional view of the one piece embodiment of FIGS. 3 and 5;

FIG. 8 is a cross sectional view taken along lines 8—8 in FIG. 6; and

DETAILED DESCRIPTION OF THE INVENTION

Figure 9:
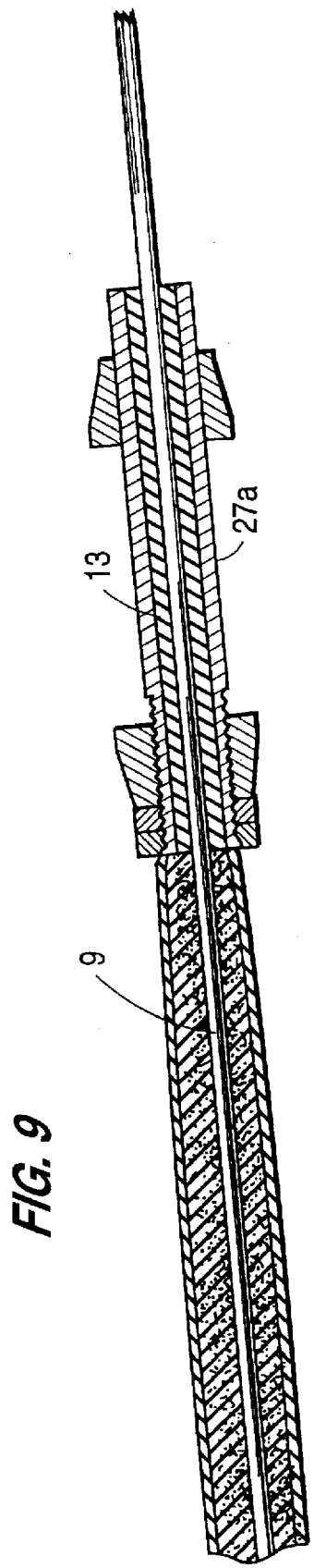
FIG. 9 is a cross sectional view of an alternative embodiment.

Two embodiments of a fishing rod butt are illustrated. In FIG. 1 a butt 1 is seen with a conventional rod 3 attached thereto. A reel 4 is seen placed on a reel seat 5.

Referring to FIG. 2, a rod blank 9 forms the central portion of the butt 1. The rod blank is preferably formed of fiber glass and can either be a solid rod form or it can be tubular. A hand grip 11 is slid over the rod blank 9. As seen in better detail in FIGS. 6–8, the hand grip is formed of a foam EVA 11a surrounded by a protective coating 11b, preferably in the form of polyvinyl chloride (PVC). A pair of arbors 13 and 15, preferably made of wood, are positioned at an upper end and lower end of the rod blank 9, respectively. These arbors are also preferably glued to the fiber glass rod blank. A gimbal 17 is in turn glued to arbor 15. The gimbal has mutually orthogonal pairs of aligned recesses 19.

The various elements are seen in the assembled form in FIG. 6. Also seen in FIGS. 2 and 6 is a ring 21 which slides over the gimbal 17 and abuts and is glued to the hand grip 11. This retains the gimbal within the entire unit. A cap 23, preferability of PVC, is pushed over the end of the gimbal, the provision of a cap providing versatility to the butt wherein the recesses 19 on the gimbal can be exposed for use in conjunction with a rod holder on a boat. Alternatively with the cap 23 in place, the rod can be handheld as seen in FIG. 1.

Referring to the upper end of the butt in FIGS. 2, 4 and 6, the reel seat 5 has a lower end 25 having an opening therein which is slid over and glued to the wood arbor 13. The reel seat includes a shank portion 27 having a preferably fixed hood 29 at the upper end and an adjustable hood 31 at the lower end. The adjustable hood 31 is moveable on the shank 27 and is adjusted by means of a pair of knurled, threaded rings 33 which are adjustable on threads 35 on the shank 27. Alternatively, hood 29 may be adjustable together with hood 31 or preferably hood 31 is maintained stationary, and hood 29 is moveable with similar knurled, threaded rings 33. In the design of FIGS. 2, 4 and 6 a ferrule 37 is inserted within the shank 27. The ferrule 37 has a groove 39 which cooperates with an extension 41 (seen in FIG. 6) which is used to close off a portion of the reel seat 5. This permits aligning of a rod which is used with the butt so that a plurality of guides 43 (seen in FIG. 1) are properly aligned in relation to the orthogonal recesses in gimbal 17. The ferrule 37 has a threaded, knurled ring 45 which cooperates with a plurality of threads 47 on shank 27. Also located within the ferrule 37 is a recess 49 for receiving a fishing rod such as 3 in FIG. 1.

In the alternative embodiment seen in FIGS. 3, 5 and 7 the shank 27a of the reel seat 5a extends beyond the end of the hood 29 and does not receive a ferrule 27. As seen in FIG. 7, a complete rod assembly can be inserted into an opening 51, or alternatively, rod blank 9 can be extended and form the fishing rod 3 as shown, for example, in FIG. 9.

Method of Assembly

Referring to FIG. 2, hand grip 11 is formed by gluing protective layer 11b over foam layer 11a. Hand grip 11 is then slid over rod blank 9 such that portions of rod blank 9 extend from each end of hand grip 11 to form the upper portions of rod blank 9. The arbors 13 and 15 are then glued, respectively, to the upper and lower portions of rod blank 9. Gimbal 17 is then glued to arbor 15, with ring 21 pushed over gimbal 17 and glued into contact with the lower portion of hand grip 11.

The reel seat 5 is then slid over and glued to arbor 13. In the alternative embodiment, reel seat 5a would be slid over and glued to arbor 13. Thus, a complete fishing rod in accordance with the instant invention is assembled. At this point, the user may opt to place plastic cap 23 over gimbal 17. Also, depending upon the configuration, a tip portion of a fishing rod can be attached to the butt portion of the instant invention. In the embodiment in FIGS. 2, 4, and 6, this is accomplished by configuring a tip portion with ferrule 37 to create a removable upper portion of a two piece fishing rod. In the alternative embodiment of FIGS. 3, 5 and 7, the tip portion would be permanently affixed to the reel seat, creating a one piece fishing rod.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features herein before set forth and falling within the scope of the invention or the limits of the appended claims.

What is claimed is:

1. A fishing rod butt, comprising a portion of a fishing rod including a rear handle section through a reel seat, the fishing rod butt being for engagement with a tip poriton of a fishing rod and comprising:

a) a rod blank having an upper end and a lower end, b) a hand grip over a portion of the rod blank, c) a reel seat adjacent the hand grip and around at least a portion of the upper end of the rod blank, and d) an arbor around at least a portion of one of the ends of the rod blank.

2. A fishing rod butt as defined in claim 1, including another arbor around at least a portion of an opposing end of the rod blank.

3. A fishing rod butt as defined in claim 1, wherein the hand grip is formed of two layers.

4. A fishing rod butt as claimed in claim 3, wherein one layer comprises a foam material.

5. A fishing rod butt as claimed in claim 4, wherein the other layer comprises a protective plastic coating over the foam material.

6. A fishing rod butt as claimed in claim 5, wherein the one layer comprises EVA and the other layer comprises polyvinylchloride.

7. A fishing rod butt as claimed in claim 1, including a gimbal positioned over the rod blank at the lower end thereof.

8. A fishing rod butt as claimed in claim 7, including a cap positioned on the gimbal.

9. A fishing rod butt as claimed in claim 2, wherein the reel seat is positioned around the arbor at the upper end of the rod blank.

10. A fishing rod butt as claimed in claim 1, including a ferrule inserted in and extending from the reel seat, the ferrule having a receptacle for receipt of said tip portion of a fishing rod.

11. A fishing rod butt as claimed in claim 10, wherein the ferrule has a closed end with a groove formed in a lower-directed end.

12. A fishing rod butt as claimed in claim 11, including a closed end on an interior of the reel seat, an extension on the closed end, and the extension cooperating with the groove to form an aligned pair of members.

13. A fishing rod butt as claimed in claim 1, wherein the reel seat includes a pair of hoods, at least one of which being adjustable relative to the other.

14. A method of assembling a fishing rod butt comprising the steps of:

(a) forming a hand grip by placing a protective layer over a foam layer;

(b) sliding the hand grip over a rod blank such that an upper portion and a lower portion of the rod blank extend from the hand grip;

(c) sliding an arbor over each of the upper and lower portions of the rod blank, and gluing the arbors to the rod blank;

(d) affixing a gimbal to one of the arbors; and (e) affixing a reel seat to the other of the arbors.

15. A method of assembling a fishing rod, comprising the method of assembling a rod butt of claim 14, and further comprising the step of attaching a tip portion of a fishing rod to the reel seat.

16. A method of assembling a fishing rod, comprising the method of assembling a rod butt of claim 14, and further comprising the step of attaching a tip portion of a fishing rod to the upper portion of the rod blank.

17. A method of assembling a fishing rod, comprising the method of assembling a rod butt of claim 14, and further comprising the step of coupling a tip portion of a fishing rod to the upper portion of the rod blank.

18. The method of claim 17, wherein the step of coupling a tip portion of a fishing rod to the reel seat comprises the step of connecting a tip portion of a fishing rod to a ferrule, and connecting the ferrule to the reel seat.

19. A method of assembling a fishing rod, comprising the steps of:

(a) forming a hand grip by placing a protective layer over a foam layer;

(b) sliding the hand grip over a fishing rod blank such that an upper portion and a lower portion of the fishing rod blank extend from the hand grip;

(c) sliding at least one arbor over at least one of the upper and lower portions of the fishing rod blank and fixing said at least one arbor in position relative to a longitudinal axis of the rod blank, and (d) affixing at least one of a gimbal and a reel seat to said at least one arbor.

* * * * *